United States Patent
Rupert

(10) Patent No.: US 6,717,053 B2
(45) Date of Patent: Apr. 6, 2004

(54) WORK SURFACE POWER MODULE SYSTEM WITH INTERCHANGEABLE COVERS

(75) Inventor: Brian K. Rupert, Kendallville, IN (US)

(73) Assignee: Dekko Engineering, Inc., Kendallville, IN (US)

( * ) Notice: Subject to any disclaimer, the term of this patent is extended or adjusted under 35 U.S.C. 154(b) by 0 days.

(21) Appl. No.: 10/397,698

(22) Filed: Mar. 26, 2003

(65) Prior Publication Data

US 2003/0183409 A1 Oct. 2, 2003

Related U.S. Application Data

(60) Provisional application No. 60/368,004, filed on Mar. 27, 2002.

(51) Int. Cl.[7] .............................................. H01R 13/46
(52) U.S. Cl. ............................ 174/53; 174/67; 174/58; 174/59; 220/3.6; 439/574; 439/535; 439/488
(58) Field of Search ...................... 174/53, 67, 58, 174/57, 59; 220/3.6; 439/574, 535, 488

(56) References Cited

U.S. PATENT DOCUMENTS

| 3,840,692 A | 10/1974 | Wells | 174/66 |
|---|---|---|---|
| 4,165,443 A | * 8/1979 | Figart et al. | 174/53 |
| 4,798,916 A | 1/1989 | Engel et al. | 174/67 |
| 5,026,300 A | 6/1991 | Varner | 439/371 |
| 5,231,562 A | * 7/1993 | Pierce et al. | 361/832 |
| 5,240,426 A | 8/1993 | Barla | 439/136 |
| 5,457,286 A | 10/1995 | Flasz | 174/66 |
| 5,471,012 A | * 11/1995 | Opel | 174/53 |
| 5,964,618 A | 10/1999 | McCarthy | 439/574 |
| 5,965,846 A | 10/1999 | Shotey et al. | 174/66 |
| 6,150,007 A | * 11/2000 | Oshima et al. | 428/161 |
| 6,283,787 B1 | 9/2001 | Chou | 439/488 |

* cited by examiner

*Primary Examiner*—Dean A. Reichard
*Assistant Examiner*—Anton B Harris
(74) *Attorney, Agent, or Firm*—Taylor & Aust, P.C.

(57) ABSTRACT

A work surface electrical power distribution system including a plurality of first housing portions each having a different visual indicator and an electrical power assembly. The electrical power assembly including at least one electrical power receptacle, a second housing portion removably mountable to a work surface, the at least one electrical power receptacle connected to the second housing portion and a selected one of the plurality of first housing portions removably attached to the second housing portion.

20 Claims, 2 Drawing Sheets

100 # WORK SURFACE POWER MODULE SYSTEM WITH INTERCHANGEABLE COVERS

CROSS REFERENCE TO RELATED APPLICATIONS

This is a non-provisional application based upon U.S. provisional patent application serial No. 60/368,004, entitled "WORK SURFACE POWER MODULE WITH INTERCHANGEABLE DESIGNER COVERS", filed Mar. 27, 2002.

BACKGROUND OF THE INVENTION

1. Field of the Invention

The present invention relates to a power module mountable on a work surface and more particularly, to a power module mountable on a work surface with a removable cover.

2. Description of the Related Art

Personal computers have been developed for many applications in many fields, such as medical care, business, education and industry. Due to the diverse applications, there are many peripheral devices, which cooperate with the personal computer to achieve particular functions. Nearly all of the peripheral devices associated with personal computers require electrical power connections.

Electrical power connections are available by way of electrical power strips containing multiple electrical receptacles. Power strips include not only receptacles for the distribution of electric power, but some power strips have power conditioning capabilities therein, such as over voltage protection. Power strips typically have multiple power outlets and a switch to turn at least a portion of the electrical receptacles on and off.

What is needed in the art is a device for providing power and communication receptacles in an easily relocatable and attachable configuration.

SUMMARY OF THE INVENTION

The present invention provides a portable power module system with a selectable cover.

The invention comprises, in one form thereof, a work surface electrical power distribution system including a plurality of first housing portions each having a different visual indicator and an electrical power assembly. The electrical power assembly including at least one electrical power receptacle, a second housing portion removably mountable to a work surface, the at least one electrical power receptacle connected to the second housing portion and a selected one of the plurality of first housing portions removably attached to the second housing portion.

An advantage of the present invention is that it has interchangeable covers.

Another advantage of the present invention is that the covers can be quickly changed to match an office decor or to denote particular work project.

Yet another advantage of the present invention is that the cover can be easily removed to mount the present invention or to adjust or maintain devices therein.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
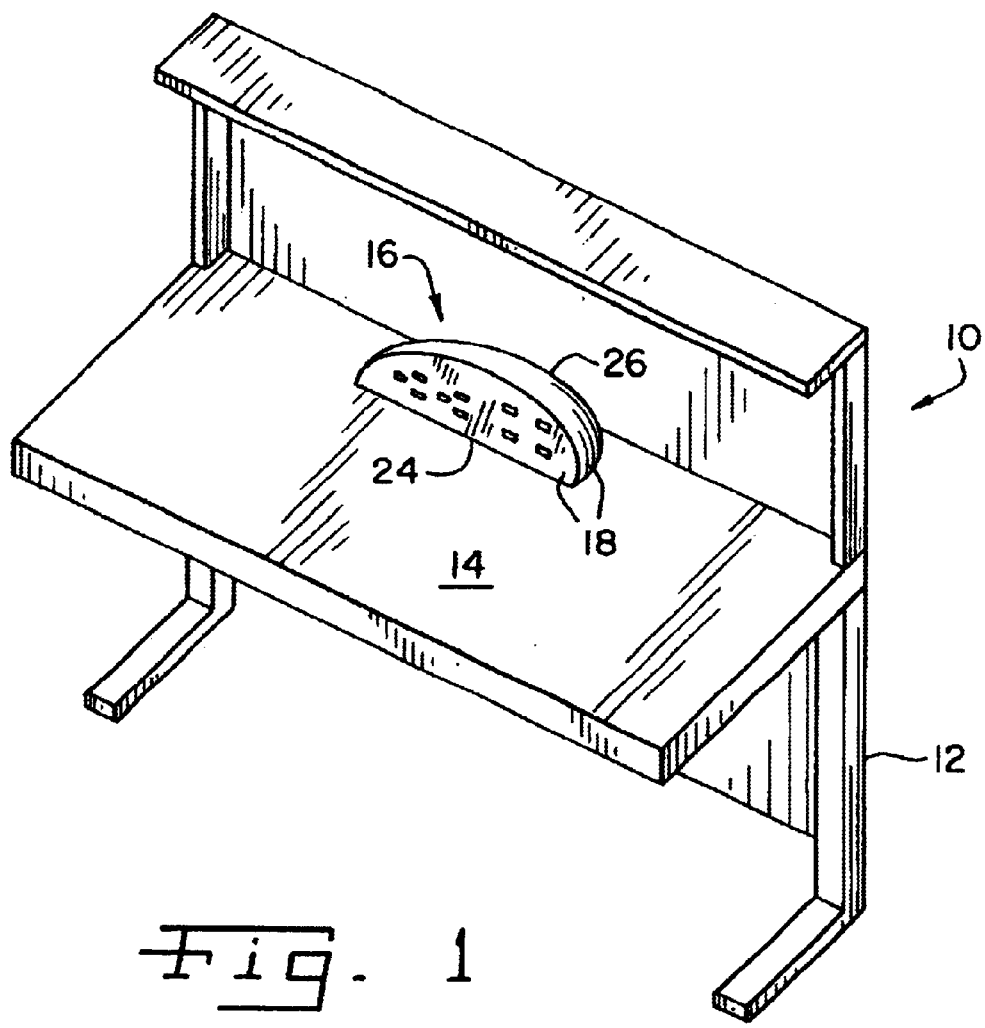
FIG. 1 is a perspective view of an embodiment of a power module mounted on a work center according to one form of the invention.

Referring now to the drawings, and more particularly to FIG. 1, there is shown a work center 10 having a support 12 and a work surface 14. Power module 16 is mounted upon work surface 14.

Figure 2:
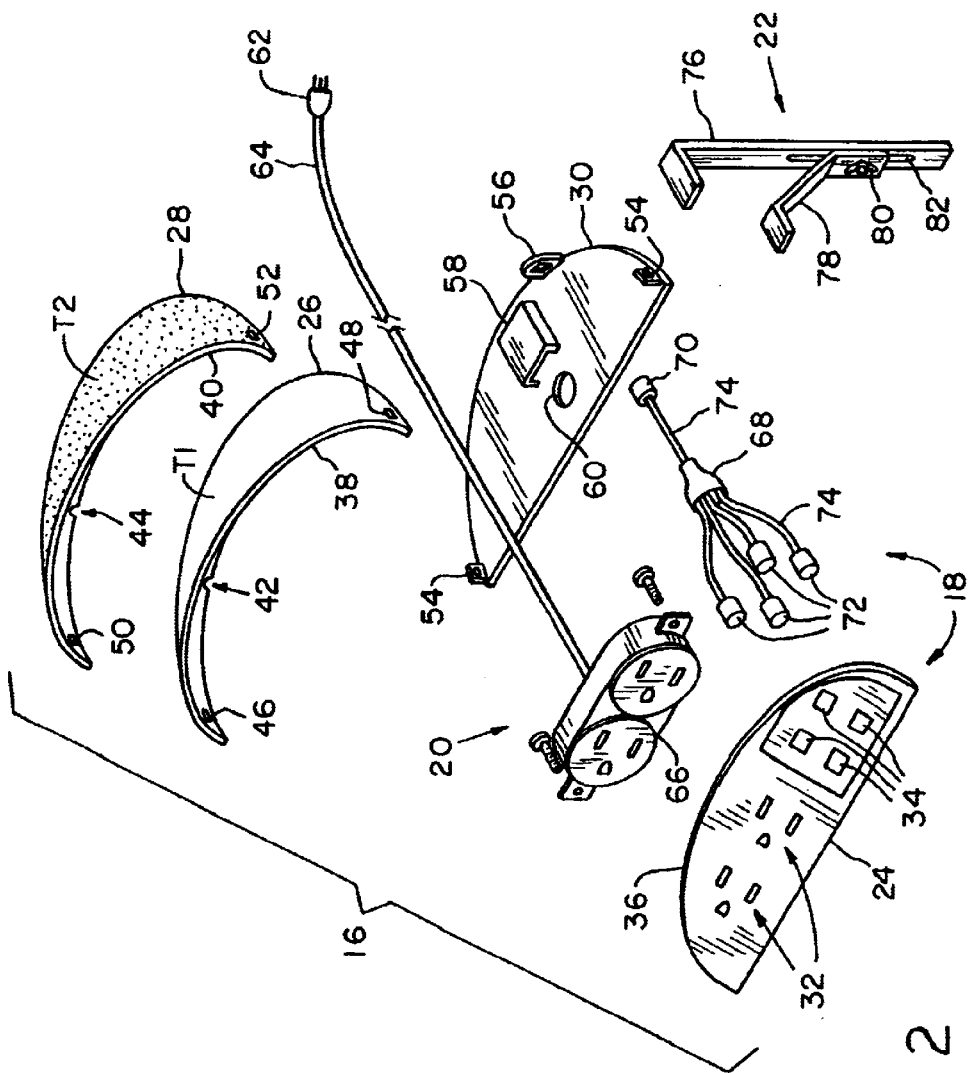
FIG. 2 is a perspective exploded view of the power module of FIG. 1.

Now, additionally referring to FIG. 2, there is shown power module system 16 including housing 18, a power assembly 20 and a clamping device 22. Housing 18 includes a face plate 24, covers 26 and 28 and a lower housing 30. Face plate 24, cover 26 and lower housing 30 are snapped together in a self engaging manner. Face plate 24 and lower housing 30 may be fastened together with fasteners or they may be of integral construction.

Face plate 24 includes power distribution openings 32, communication connection openings 34 and contoured surface 36. Power distribution openings 32 accommodate a power receptacle to thereby allow a power plug to be plugged into and through power distribution openings 32 into the electrical receptacle. Communication connection openings 34 are positioned and sized to accommodate connectors that may be snapped into place therethrough. Contoured surface 36 is shaped to interface with covers 26 and 28.

Covers 26 and 28, respectively, include contoured surfaces 38 and 40 and cord notches 42 and 44. Contoured surfaces 38 or 40 are shaped to coact with contoured surface 36 to enclose housing 18 and to prevent unintentional contact with electrical power contained therein. Cord notches 42 and 44 allow a power cord to egress from the interior of housing 18.

Cover 26 has a surface feature T1, which is a visual indicator T1 and cover 28 likewise has a surface feature T2, which is a visual indicator T2. Visual indicator T1 is different than visual indicator T2. Visual indicators T1 and T2 include such characteristics as various colors, surface textures, patterns and/or shapes. A cover 26 or 28 is selected with a visual indicators T1 or T2 to help identify power module 16 with such things as the power capacity, voltage, project and/or the office decor. Covers 26 and 28 even if shaped differently than that shown in the figures, have a peripheral edge with a contour that matches with face plate 24 and lower housing 30. Covers 26 and 28 are interchangeable on power module 16 to thereby accommodate changes in office color schemes, project identification or power capacities. Further, covers 26 and 28 may nest on top of each other, for example cover 28 may be nested on top of cover 26, which is installed on power module 16.

Covers 26 and 28 have self-engaging features in the form of protrusions 46 and 50 with corresponding indentations 48 and 52. Although not specifically seen in FIG. 2, cover 26 has at least two protrusions 46 and two indentations 48, on complimentary sides of cover 26. Cover 28 likewise has two protrusions 50 and two indentations 52, on complimentary sides, thereof. Protrusions 46 or 50 connect with engagement holes 54 of lower housing 30 thereby connecting cover 26 or 28 thereto without the necessity of ancillary fasteners. In addition, protrusions 50 may coact with indentations 48 to allow cover 28 to nest on top of cover 26 in a self-engaging manner.

Lower housing 30 includes communication connection opening 56, a clamp interface 58 and a grommet mount hole 60. Communication connection opening 56 allows a communication connector to be snapped into place for access to a cable (not shown). Clamp interface 58 interacts with clamping device 22 to detachably clamp power module 16 to work surface 14. Grommet mount hole 60 provides for an alternative mounting method of power module 16 to work surface 14 by way of placing a hole in work surface 14 and clamping power module 16 thereto, through grommet mount hole 60.

Power assembly 20 includes power plug 62, conductors 64, a duplex receptacle 66, a signal splitter 68, an entrance connector 70, interface connector 72 and conductors 74. Power plug 62 is electrically connected to conductors 64 that provides power to duplex receptacle 66. Duplex receptacle 66 is fastened to the back side of face plate 24 and aligned such that the power terminals cooperate with power distribution openings 32 to thereby allow a plug to be inserted into power distribution openings 32 and to make electrical contact with duplex outlet 66.

Signal splitter 68 is connected to a bi-directional data signal and it splits the signal into multiple bi-directional signals. Each of those signals may be further split by other electronic circuits 68. Signal splitter 68 is mounted to lower housing 30 and positioned so that conductors 74 are routed to allow connectors 70 and 72 to be, respectively, snapped into communication connection opening 56 and communication connection openings 34.

Clamping device 22 includes L-shaped bracket 76, a clamping bracket 78 and fastener 80. L-shaped bracket 76 interacts with clamp interface 58 to connect clamping device 22 to lower housing 30. Clamping bracket 78 is slidably positioned along L-shaped bracket 76 by way of slot 82. Fastener 80 tightens clamping bracket 78 against L-shaped bracket 76 as a surface of clamping bracket 78 contacts a lower surface of work surface 14.

Power module 16 is mounted to a work surface 14 of work center 10 by using clamping device 22. Plug 62 is connected to an electrical outlet, thereby providing power to power module 16. A communications cable (not shown) is connected to entrance connector 70 on the back side of power module 16. Power module 16 can be relocated by loosening of clamping device 22 and repositioning of power module 16 on work surface 14. Alternatively, clamping device 22 may be omitted and power module 16 positioned in any convenient location. Cover 26 may be removed from power/communications module 16 without the use of tools by slightly flexing cover 26 and disengaging protrusions 46 from engagement holes 54. Once cover 26 is removed any adjustments, connections, circuit replacement, etc. may take place and then cover 26 is snapped back into place on power/communications module 16. Cover 28 may be placed on power/communications module 16 instead of cover 26 to thereby alter the visual indicator from T1 to T2. Alternatively, cover 28 may be snapped into place on top of cover 26 thereby changing the surface feature that is exposed to visual indicator T2.

Normally only one cover is installed on power/communications module 16 and that cover is selected from a variety of covers, such as covers 26 and 28. Covers 26 and 28 may be supplied in a kit form along with power module 16 or a cover 26 or 28 may be selected from a variety of covers in an inventory. The selected cover is then installed as a part of power/communications module 16. The installation of the selected cover can advantageously be accomplished with out the need for tools.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A work surface electrical power distribution system, comprising:
   a plurality of first housing portions each having a different visual indicator; and
   an electrical power assembly including:
   at least one electrical power receptacle;
   a second housing portion removably mountable to a work surface, said at least one electrical power receptacle connected to said second housing portion apart from said plurality of first housing portions; and
   a selected one of said plurality of first housing portions removably attached to said second housing portion.

2. The system of claim 1, wherein said visual indicator includes at least one of color, texture, surface pattern and surface shape.

3. The system of claim 1, further comprising an other selected one of said plurality of first housing portions attached over and substantially covering said selected one of said plurality of first housing portions.

4. The system of claim 1, wherein said selected one of said plurality of first housing portions is connected to said second housing portion without the use of tools.

5. The system of claim 1, wherein said selected one of said plurality of first housing portions and said second housing portion include cooperative structures that connect said selected one of said plurality of first housing portions and said second housing portion together without separate fasteners.

6. The system of claim 1, wherein said second housing portion includes a face surface to which said at least one electrical receptacle is connected.

7. The system of claim 1, further comprising a clamping mechanism connected to said second housing portion, said clamping mechanism configured to engage a portion of said work surface.

8. A work center, comprising:
   a work surface; and
   a work surface electrical power distribution system, including:
   a plurality of first housing portions each having a different visual indicator; and
   an electrical power assembly including:
   at least one electrical power receptacle;

a second housing portion removably mountable to a work surface, said at least one electrical power receptacle connected to said second housing portion apart from said plurality of first housing portions; and a selected one of said plurality of first housing portions removably attached to said second housing portion.

9. The work center of claim 8, wherein said visual indicator includes at least one of color, texture, surface pattern and surface shape.

10. The work center of claim 8, further comprising an other selected one of said plurality of first housing portions attached over and substantially covering said selected one of said plurality of first housing portions.

11. The work center of claim 8, wherein said selected one of said plurality of first housing portions is connected to said second housing portion without the use of tools.

12. The work center of claim 8, wherein said selected one of said plurality of first housing portions and said second housing portion include cooperative structures that connect said selected one of said plurality of first housing portions and said second housing portion together without separate fasteners.

13. The work center of claim 8, wherein said second housing portion includes a face surface to which said at least one electrical receptacle is connected.

14. The work center of claim 8, further comprising a clamping mechanism connected to said second housing portion, said clamping mechanism configured to engage a portion of said work surface.

15. A method of altering a visual indicator of a power module surface, comprising the steps of:

providing a power module having a first housing portion and a second housing portion in at least partial contact with said first housing portion, said first housing portion including an electrical receptacle apart from said second housing portion, said second housing portion having a first visual indicator; and installing a third housing portion having a second visual indicator on said power module, wherein said first visual indicator is different than said second visual indicator.

16. The method of claim 15, further comprising the step of removably affixing said first housing portion to a work surface.

17. The method of claim 15, wherein said first visual indicator and said second visual indicator include at least one of the characteristics of color, texture, surface pattern and surface shape.

18. The method of claim 15, further comprising the step of removing said second housing portion from said power module.

19. A work surface electrical power distribution kit, comprising:

a plurality of first housing portions each having a different visual indicator; and an electrical power assembly including:
  at least one electrical power receptacle; and
  a second housing portion removably mountable to a work surface, said at least one electrical power receptacle connected to said second housing portion apart from said first housing portion, said plurality of first housing portions configured for selective removable attachment to said second housing portion.

20. The kit of claim 19, wherein said visual indicator includes at least one of color, texture, surface pattern and surface shape.

* * * * *